United States Patent [19]
Hopler, Jr.

[11] 3,772,794
[45] Nov. 20, 1973

[54] BOREHOLE MEASURING DEVICE

[75] Inventor: Robert D. Hopler, Jr., Succasunna, N.J.

[73] Assignee: Hercules Incorporated, Wilmington, Del.

[22] Filed: Dec. 22, 1971

[21] Appl. No.: 210,860

[52] U.S. Cl. ............................................. 33/178 F
[51] Int. Cl. ....................... E21b 47/08, G01b 5/12
[58] Field of Search .............. 33/178 F, 302, 178 R, 33/178 E, 174 L

[56] References Cited
UNITED STATES PATENTS

| | | | |
|---|---|---|---|
| 2,340,987 | 2/1944 | Robidoux | 33/178 F |
| 2,829,441 | 4/1958 | Bagnell | 33/178 F |
| 2,864,173 | 12/1958 | Castel | 33/178 F |

Primary Examiner—Robert B. Hull
Assistant Examiner—Richard R. Stearne
Attorney—S. Grant Stewart et al.

[57] ABSTRACT

A device for measuring cross-sectional dimension of a borehole including an elongated shell (for upward positioning) and a plurality of downwardly extending and spaced-apart arms pivotally attached at their upper ends to a lower end portion of the shell; a shaft extending longitudinally through the shell, and a solid member, generally disc-like, attached to the bottom end of the shaft within the confines of the arms to cause the arms to pivotally ride along the periphery thereof when the shaft is raised; a cable attached to an upper end of the shaft for raising it, and associated elements for measuring the longitudinal travel of the cable (when taut) as an index of pivotal travel of the arms, the latter being a measure of the borehole dimension at that level.

8 Claims, 7 Drawing Figures

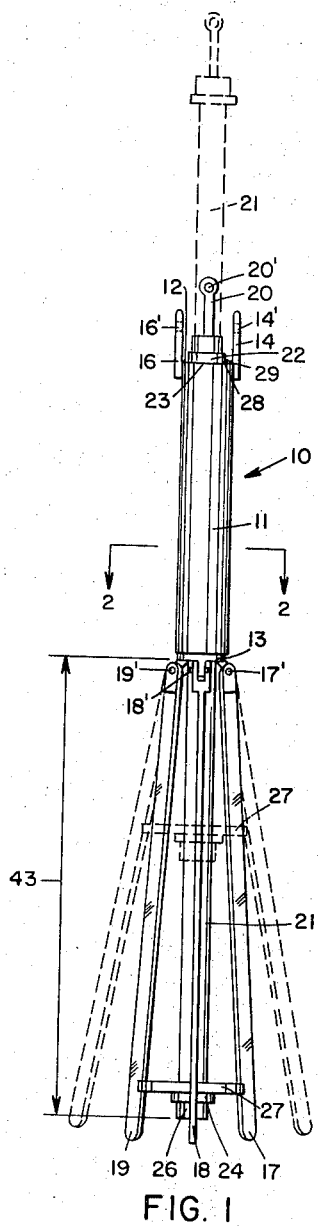
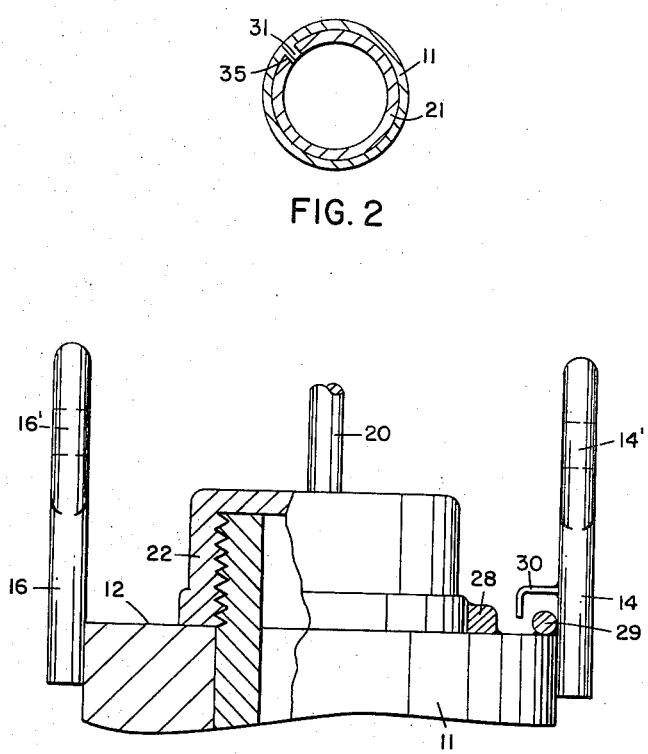
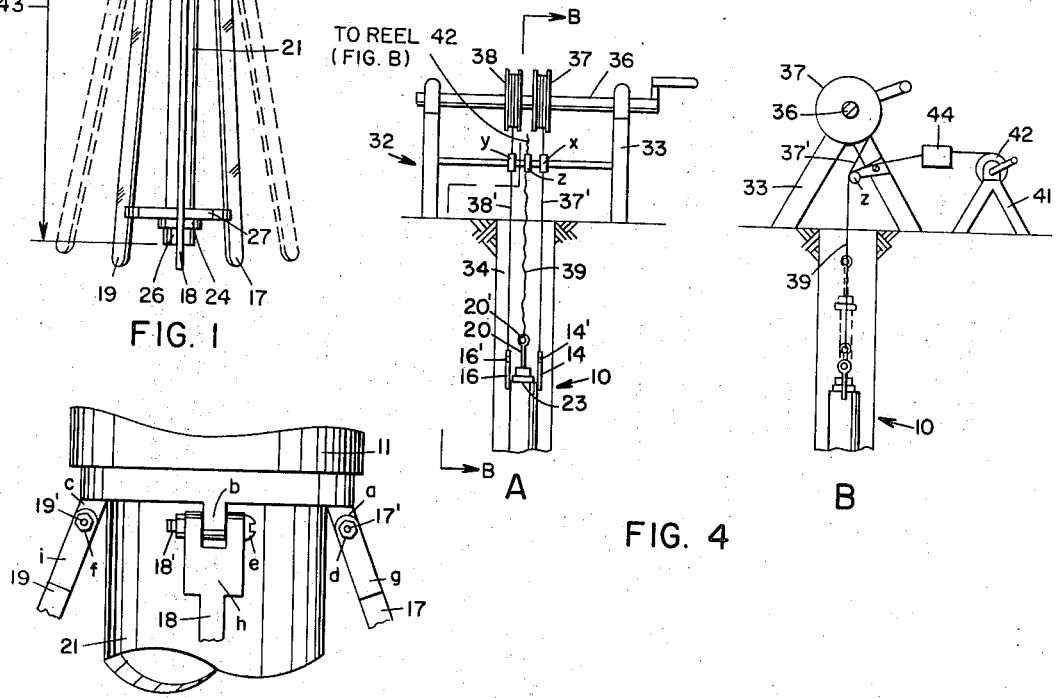
FIG. 1
FIG. 1A
FIG. 2
FIG. 3
FIG. 4

BOREHOLE MEASURING DEVICE

This invention relates to a borehole measuring device. In one aspect this invention relates to a device for measuring cross-sectional dimension of a borehole. In still another aspect this invention relates to such device for measuring the diametric variations in a borehole as basis for determination of contour of the borehole wall along any predetermined portion of its length. Other aspects will be apparent in light of the accompanying disclosure and the appended claims.

Measurement of cross-sectional dimension in boreholes as basis for determination of borehole volume is frequently necessary in drilling and mining operations, in order to anticipate the required quantity of drilling fluid, or explosives, as the case may be. Such borehole measurements are particularly applicable to jet piercing and jet chambering operations in which the contour of the borehole wall, and hence volume of the borehole cavity to be charged, varies over a broad range. Various caliper type devices have been proposed for carrying out these measurements but have been of complex and unwieldy design, and have presented numerous operating problems.

This invention is concerned with a caliper type device of simplified design for measurement of transverse borehole dimensions without the numerous operating disadvantages encountered heretofore in that practice.

In accordance with the invention, a device for measurement of transverse cross-sectional dimension of a borehole is provided, which comprises an elongated shell for upright positioning, open at each of the upper and lower ends, and adapted for attachment of suspension cable means to an upper end portion thereof;

a plurality of equi-length spaced apart arm members pivotally attached to a lower end portion of said shell within substantially a common plane perpendicular to the shell axis, and extending downwardly from said shell;

a rigid shaft, longer than, and extending longitudinally through, said shell, and longitudinally movable within said shell;

stop means for preventing longitudinal ingress of each end of said shaft into said shell;

a solid piece member attached to said shaft below said shell and facing said shell from within the confines of said arms, and extending laterally from said shaft beyond the locus of the pivot points of said arms, whereby said arms rest against the solid piece member at outer points thereon and said shaft is longitudinally movable to cause said solid piece member to move along adjacent arm surfaces to in turn cause said arms to pivotally travel about said pivot points;

suspension cable means attached to said shaft for raising same longitudinally from said shell;

signal means for indicating when the last said suspension cable means is initially taut for raising said shaft from said shell;

and means for measuring longitudinal distance of upward travel of the last said cable means when taut, as an index of lateral distance of pivotal travel of said arms.

The invention is further described with reference to the attached drawings of which FIG. 1, also with reference to FIG. 1A, is a view of one embodiment of the device of the invention in initial position (solid lines) for emplacement in a borehole, and in subsequent operating position (dotted lines);

FIG. 2 is a view along the line of 2—2 of FIG. 1 showing coaxially disposed shell, and shaftmembers and spline means to preclude separate rotation of those elements;

FIG. 3 is an enlarged view of a top section of the device of FIG. 1 further illustrating a now preferred form of signaling means for indicating the device to be in emplacement for beginning the borehole measuring operation;

FIG. 4 (A&B) illustrates a now preferred assembly for lowering the device of FIG. 1 into emplacement in a borehole and for operating same to effect the contemplated measurement;

Figure 6:
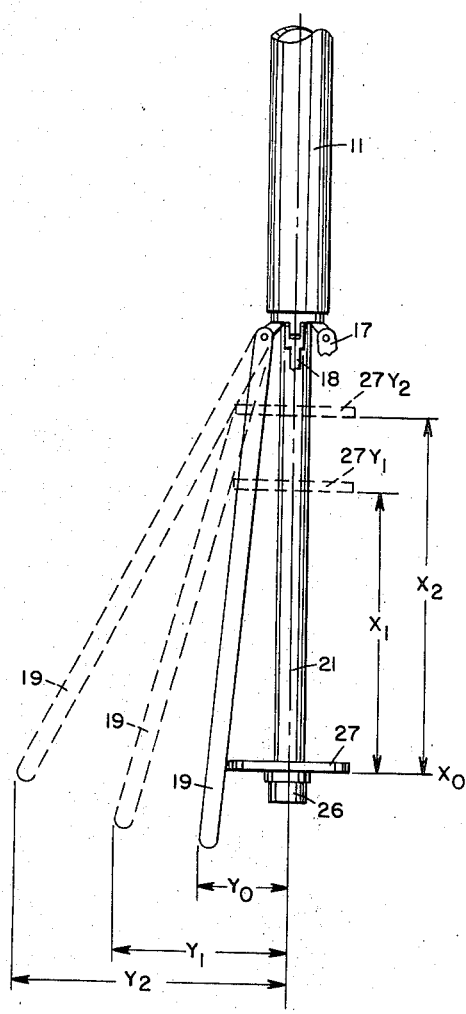
FIG. 6 illustrates one means for calibration of the device of FIG. 1 to correlate upward longitudinal travel of the shaft member with cross-sectional dimension of the borehole.

Referring to FIG. 1, borehole measuring device 10 (solid lines only) is shown in an upright position for lowering to emplacement in the borehole. Elongated shell 11 of device 10 is open at each of upper and lower ends 12 and 13 respectively. Eyebolts 14 and 16 including eyelets 14' 16' respectively, spaced apart at about 180° are secured to, and extend upwardly from upper end 12 of shell 11 for engagement of separate strands of suspension cable, the latter constituting means for lowering the device 10 into, and raising it from, emplacement in the borehole.

Arm members 17, 18 and 19 are pivotally attached to shell 11 at the lower end 13 thereof, within substantially a common plane perpendicular to the longitudinal axis of shell 11, and extend downwardly from shell 11. Each of the pivotal points 17', 18' and 19' is formed respectively by an eye member (See FIG. 1A) a, b and c, attached to shell 11 and engaged by a pin member d, e and f respectively with clevis end member g, h and i of arms 17, 18 and 19 respectively, as illustrated. In preferred practice, the pivotal structure at each point 17', 18' and 19' is adapted to direct the arm suspended therefrom in pivotal travel in a plane containing the axis of shell 11.

Shaft 21, longer than shell 11, extends longitudinally through shell 11 and is adapted to longitudinally travel through shell 11 including both ends 12 and 13. However, ingress of either end of shaft 21 into either top or lower ends 12 and 13 respectively of shell 11 is precluded by suitable stop means. In the embodiment shown, shaft 21 is a pipe member substantially concentric with shell 11 and is threadably connected with cap member 22 at the upper end 23, and with cap member 24 at the bottom end 26, both caps having an external cross-sectional diameter greater than the internal cross-sectional diameter of shell 11 at ends 12 and 13 respectively. Eyebolt 20, with eye 20', threadably connecting with cap member 22, generally coaxially, extends upwardly from member 22 for engagement of a suspension cable 39 (FIG. 4) for raising shaft member 21 from initial emplacement position, described in more detail hereinafter.

A solid piece member 27, preferably in form of a disc, is attached to shaft 21, below shell 11 and is disposed within the confines of arms 17, 18 and 19. Disc 27 faces shell 11 and extends laterally from shaft 21 beyond the locus of pivot points of the arms 17, 18 and 19. Accordingly, the arm members 17, 18 and 19, at all times, rest against the outer periphery of disc 27 so that when shaft 21 is longitudinally moved, the disc member 27 travels along the adjacent arm surfaces, i.e., the arms "ride" on the disc periphery, to in turn cause the arms to pivotally travel about the pivot points 17', 18' and 19', as illustrated in FIG. 1 with reference to the dotted lines. Thus, as shaft 21 is raised from shell 11, disc 27 travels upwardly along the projected axis of shell 11 causing each of arms 17, 18 and 19 to "ride" on the disc 27 periphery and hence swing out about their respective pivot points. Device 10 is operated at a predetermined level in a borehole and shaft 21 is caused to rise therefrom until disc 27 has causes arms 17, 18 and 19 to pivotally move a sufficient lateral distance to contact the walls of the borehole. At that point the distance of upward longitudinal travel of disc 27 is noted and correlated with the lateral distance of pivotal travel of the arms as an index of lateral dimension of the borehole at that level.

Permanent magnet 28 is secured by conventional means to the upper end 23 of shaft 21, preferably to pipe cap 22 in directly opposed relation to magnetic reed type switch 29 secured to the uppermost end 12 of shell 11. Switch 29 is an element of an electric circuit including a filament type indicator light signaling that the shaft 21 is in position for operation of device 10. Shell 11 and shaft 21, as concentric pipe type elements are maintained non-rotatable with reference to the other by spline means illustrated in FIG. 2 which includes key element 31 at the inner wall of shell 11 and integral therewith and extending substantially the entire length of shell 11 coplanarly with the shell 11 axis in slot 35 in the side wall of shaft 21. The splined relationship of shell 11 and shaft 21 of FIG. 2, by precluding the independent rotation, minimizes possibilities for entanglement of the suspension cable lines further described herein, and prevents disengagement of elements 28 and 29 of the signal system of FIGS. 1 and 3.

FIG. 3 shows an enlarged view of an upper end portion of the device of FIG. 1, including a more detailed view of magnetic switch assembly 28-29. Referring to FIG. 3, permanent magnet 28 is secured to the external wall of cap closure 22, being thereby always retained outside shell 11, but nevertheless, adjacent the end of shell 11 at the point of maximum degree of ingress of shaft 21 into shell 11. Reed switch 29 is secured to the end 12 of shell 11 directly opposite magnet 28 in close operating relationship therewith. In all events each of the two members, 28 and 29 is spaced with reference to the other, so that magnet 28 will move into, and from, activating relationship with switch 29, the latter as an element of an electric circuit described hereinafter. A suitable ferrous metal shield 30 attached to the end of shell 11, advantageously to eyebolt 14, encompasses switch 29 so that when shaft 21 is moved longitudinally from shell 11 the coaction of magnet 28, also moving with shaft 21, and switch 29, is terminated.

Any suitable means can be utilized for lowering device 10 of FIG. 1 into, or raising it from emplacement, in a borehole. Thus, FIG. 4 (A) shows a suitable surface mounted cable reel assembly 32 for lowering and raising device 10 into and from emplacement. Cable reel assembly 32 comprises framework 33 on the ground surface, disposed over a borehole 34 and supporting a hand cranked shaft 36 on which coaxially supported, and spaced apart, reels 37 and 38 are directly disposed over borehole 34 so as to deliver cables 37' and 38' into the borehole over guide elements $x$ and $y$ respectively.

A cable from each of reels 37 and 38 is attached respectively to eyebolts 14 and 16 through eyes 14' and 16' (See also FIG. 1) and the device, by rotation of crank shaft 36, is lowered into, or raised from, the borehole by either letting out the cable for lowering the device into emplacement or drawing the cable onto the reel to raise the device from emplacement. As shown, the device has been lowered into emplacement in the borehole 34. In that position, shaft 21 gravitates to a downward most position in shell 11, cap 22 seating on the upper end 12 of shell 11 to deny ingress of the upper end of shaft 21 into shell 11.

Suspension cable 39, connecting through eye 20' of eyebolt 20 serves no function during emplacement of device 10, and hence is untaut during the entire emplacement period. The function of cable 39 is to suspend shaft member 21 and raise it longitudinally with respect to shell 11 during the borehole measuring step. Means (not shown) associated with assembly 32 for raising and lowering cable 39 is shown in FIG. 4 (B) which is a view taken along the line B—B of FIG. 4 (A).

As shown with reference to FIG. 4(B) an additional frame structure 41 is surface mounted in close proximity to assembly 32 and includes cable reel 42 for letting out cable 39 over guide element Z, during emplacement and for taking up cable 39 for raising shaft 21 from the emplaced device during the measurement operation.

When device 10 is emplaced, cap stop member 22 is seated about its circumference on the end 12 of shell 11, thus encompassing shell 11 and supporting shaft 21 at its foremost point of longitudinal travel in shell 11. In that position, the lower portion 43 of shaft 11 extends downwardly from shell 11 within the confines of arms 17, 18 and 19 suspended from their points of pivotal connection with shell 11. At the downward most position of shaft 21, the arms 17, 18 and 19 are suspended at rest at points on the periphery of disc 27.

In operation of the emplaced device to measure the cross-sectional dimension of the borehole, it is necessary to first take-up the slack of cable 39 by drawing cable 39 onto reel 42 until cable 39 is taut. It is not until cable 39 of the emplaced device is initially taut that the borehole measurement can be initiated. It is therefore necessary to slowly draw cable 39 onto reel 42, after initial emplacement of device 10, until all of the slack in cable 39 is taken up. It is at this point that the device is in readiness for initiating the borehole measurement.

It is of course required that the operator know when the cable 39 becomes initially taut inasmuch as without that information there is no means by which to determine, during winding of the cable onto reel 42, when the longitudinal travel of the shaft 21 from the device begins. Accordingly, the magnet switch assembly 28–29 of FIGS. 1 and 3 signals the operator that the device is in readiness. Thus, when shaft 21 is in its downward most position in shell 11, permanent magnet 28, directly opposed to reed switch 29 causes switch 29 to close the electric circuit and cause the filament type indicator to light. The indicator light continues to burn during the entire period during which slack of the cable 39 is being taken up, so that failure of the light is a signal indicating the beginning of longitudinal upward travel of the cable together with corresponding rise of shaft 21, and hence disc member 27, to cause arms 17, 18 and 19 to pivotally travel toward the borehole wall. Winding of cable 39 onto reel 42 is continued, and hence upward travel of shaft 21 is continued with accompanying swinging out of arms 17, 18 and 19 toward the borehole wall. The rise of shaft 21 is continued until the arms 17, 18 and 19 contact the borehole wall at which time disc 27 can no longer be moved upwardly, and hence the upward travel of shaft 21 is terminated and cable 39 can no longer be wound on reel 42.

Any suitable means can be used for measurement of the distance through which shaft 21 has upwardly traveled in shell 11 while in borehole 34. A suitable metering means 44 at the ground surface is advantageously operatively connected with cable 39 and reel 42 to measure the total length of cable 39 wound onto reel 42 from the moment that the signal light has ceased to burn.

Calibration of the device 10, i.e. correlation of the distance of upward travel of shaft 21 with the lateral distance of pivotal travel of the arm members to arrive at the borehole measurement can be accomplished in any suitable manner. One embodiment for carrying out the calibration is illustrated with reference to FIG. 6 which shows a device of FIG. 1 at three different stages of pivotal travel of the arms, and corresponding rise of the shaft 21 in each instance. Referring to FIG. 6, dimension $Y_o$ is measured when disc 27 is at its downward most point of travel from shell 11. At that point, arm 19 obviously rests against disc 27 out of contact with the borehole wall. Disc 27 is then raised to position $X_1$ with corresponding pivotal travel of shaft 19 a lateral distance of $Y_1$, and similarly, disc 27 is raised to position $X_2$ to place arm 19 a lateral distance of $Y_2$ from the axis of shell 11. By plotting the points $2_{yo}$, $2_{y1}$ and $2_{y2}$ versus $x_o$, $x_1$ and $x_2$ respectively a curve is obtained from which any maximum distance of longitudinal upward travel of disc 27 can be read in terms of borehole dimension at that particular level.

Figure 5:
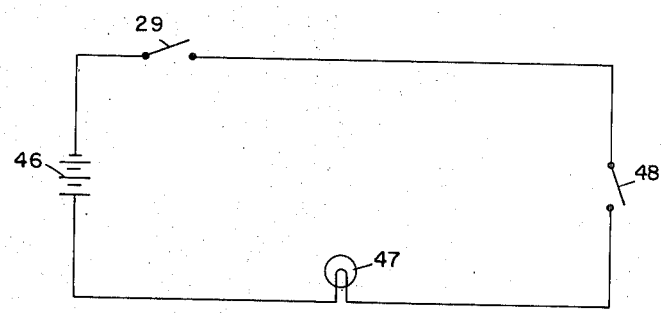
FIG. 5 illustrates an electrical circuit for inclusion in the signal system of FIGS. 1 and 3.

A suitable electric circuit of which magnetic switch 29 is an element is illustrated with reference to FIG. 5 showing a suitable battery 46 in series with a filament type light indicator 47, a switch 48 for opening the circuit when not required for use, and reed type switch 29.

Any suitable signaling device can be utilized in place of the magnetic switch assembly illustrated. For example, two wires which are in contact when the device is at rest and which break contact immediately upon initiation of longitudinal travel of shaft 21 from the shell 11 can be used, the requirement in all events being that the signaling device be electrically insulated from borehole fluid.

Any suitable means for measuring the length of the taut cable withdrawn from the borehole can be utilized, including simple markings on the cable surfaces at the ground level upon initiation, and then upon completion, of the measuring step.

It will be evident to those skilled in the art, various modifications can be made or followed, in light of the foregoing disclosure and discussion without departing from the spirit or scope of the disclosure or from the scope of the claims.

What I claim and desire to protect by Letters Patent is:

1. A device for measurement of transverse cross-sectional dimension of a borehole, which comprises
   an elongated shell for upright positioning, open at each of the upper and lower ends, and adapted for attachment of suspension cable means to an upper end portion thereof;
   a plurality of spaced apart equi-length arm members pivotally attached to a lower end portion of said shell within substantially a common plane perpendicular to the longitudinal axis of said shell, and extending downwardly from said shell;
   a rigid shaft, longer than, and extending longitudinally through, said shell, and longitudinally movable within said shell;
   stop means for preventing longitudinal ingress of each end of said shaft into said shell;
   a solid piece member attached to said shaft below said shell and facing said shell from within the confines of said arms, and extending laterally from said shaft beyond the locus of the pivot points of said arms, whereby said arms rest against the solid piece member at outer points thereon and said shaft is longitudinally movable to cause said solid piece member to move along adjacent arm surfaces to in turn cause said arms to pivotally travel about said pivot points;
   suspension cable means attached to said shaft for raising same longitudinally with respect to said shell;
   signal means for indicating when the last said suspension cable means is initially taut for longitudinally raising said shaft with respect to said shell;
   and means for measuring longitudinal distance of upward travel of the last said cable means when taut, as an index of lateral distance of pivot travel of said arms.

2. Apparatus of claim 1 including suspension cable means attached to said shell for suspension of said device to lower, and raise, same into and from said borehole.

3. A device of claim 1 wherein said shaft and said shell are disposed in slidably splined relationship so as to preclude separate rotations thereof.

4. A device of claim 3 wherein said shell and said shaft constitute concentric pipe members, and a pipe cap threaded to each end of said shaft comprise said stop means therefor.

5. A device of claim 4 further comprising a permanent magnet secured to a non-ingressing end portion of said shaft into said shell, a magnetic reed switch secured to the end of said shell adjacent said magnet, and an electric circuit, including said reed switch, adapted to close when said magnet is disposed adjacent thereto, and to open in response to longitudinal travel of said magnet away from said switch; and means for indicating when said circuit is closed and when it is open.

6. A device of claim 5 further comprising a filament type pilot light in said circuit adapted to burn when said circuit is closed and to not burn when said circuit is open in response to said longitudinal travel of said magnet.

7. A device of claim 3 wherein said solid piece comprises a disc member coaxially supported on said shaft.

8. A device of claim 7 containing a total of three of said arm members substantially equi-distantly spaced about the periphery of said shell member and pivotally attached to the lower end of said shell; and each said arm member adapted to swing from, and then retract toward, the extended longitudinal axis of said shell about its pivot point in a plane containing said extended axis.

* * * * *